(12) United States Patent
Talty et al.

(10) Patent No.: US 9,403,413 B2
(45) Date of Patent: Aug. 2, 2016

(54) SYSTEMS AND METHODS TO ASSIST IN COUPLING A VEHICLE TO A TRAILER

(71) Applicant: GM GLOBAL TECHNOLOGY OPERATIONS LLC, Detroit, MI (US)

(72) Inventors: Timothy J. Talty, Beverly Hills, MI (US); Mark E. Shields, Plymouth, MI (US); Wende Zhang, Troy, MI (US); Michael A. Wuergler, Clarkston, MI (US); Vernon Hole, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/706,821

(22) Filed: May 7, 2015

(65) Prior Publication Data

US 2015/0321666 A1 Nov. 12, 2015

Related U.S. Application Data

(60) Provisional application No. 61/989,966, filed on May 7, 2014.

(51) Int. Cl.
*B60D 1/36* (2006.01)
*B60W 30/00* (2006.01)
*B60D 1/24* (2006.01)

(52) U.S. Cl.
CPC .............. *B60D 1/36* (2013.01); *B60W 30/00* (2013.01); *B60D 1/24* (2013.01); *B60D 1/363* (2013.01)

(58) Field of Classification Search
CPC .................. B60W 30/00; B62D 12/00–12/02; B62D 13/00; B62D 15/02; B62D 15/025; B60D 1/24; B60D 1/36; B60D 1/363; B60D 1/00

USPC .................. 701/28, 36, 41, 48, 49, 300, 302; 280/477; 340/431
See application file for complete search history.

(56) References Cited

U.S. PATENT DOCUMENTS

| | | | | |
|---|---|---|---|---|
| 5,191,328 A * | 3/1993 | Nelson | ...................... | B60D 1/36 250/491.1 |
| 5,729,194 A * | 3/1998 | Spears | ...................... | B60D 1/06 280/477 |
| 6,100,795 A * | 8/2000 | Otterbacher | ............. | B60D 1/36 280/477 |
| 6,120,052 A * | 9/2000 | Capik | ...................... | B60D 1/36 280/477 |
| 6,259,357 B1 * | 7/2001 | Heider | ...................... | B60D 1/36 280/477 |
| 6,480,104 B1 * | 11/2002 | Wall | ......................... | B60D 1/36 280/477 |
| 6,765,607 B2 * | 7/2004 | Mizusawa | ................ | B60D 1/36 348/118 |
| 6,769,709 B1 * | 8/2004 | Piper | ....................... | B60D 1/36 280/432 |
| 6,886,847 B2 * | 5/2005 | Piper | ....................... | B60D 1/36 280/432 |
| 6,970,184 B2 * | 11/2005 | Hirama | ..................... | B60R 1/00 348/148 |

(Continued)

*Primary Examiner* — Thomas Tarcza
*Assistant Examiner* — Tyler J Lee
(74) *Attorney, Agent, or Firm* — Ingrassia Fisher & Lorenz, P.C.

(57) ABSTRACT

Systems and methods for assisting in coupling a vehicle and a trailer include at least one sensing device disposed on the vehicle. A first coupling is coupled the vehicle and a second coupling is coupled to the trailer. A controller in communication with the at least one sensing device is configured to identify a spatial location of the first coupling. The controller is also configured to determine a spatial location of the second coupling using data from the at least one sensing device. The controller may also calculate a path between the spatial location of the first coupling and the spatial location of the second coupling and convey the path for facilitating movement of the first coupling toward the second coupling.

19 Claims, 8 Drawing Sheets

(56) References Cited

U.S. PATENT DOCUMENTS

| | | | |
|---|---|---|---|
| 7,195,267 B1 * | 3/2007 | Thompson | B60D 1/36 280/477 |
| 7,396,035 B1 * | 7/2008 | Smith | B60D 1/36 280/477 |
| 7,777,615 B2 * | 8/2010 | Okuda | B60D 1/36 280/477 |
| 8,365,422 B1 * | 2/2013 | Ott | B60D 1/36 33/264 |
| 8,798,842 B2 * | 8/2014 | Woolf | B60D 1/36 280/479.1 |
| 2015/0115571 A1 | 4/2015 | Zhang et al. | |

* cited by examiner

SYSTEMS AND METHODS TO ASSIST IN COUPLING A VEHICLE TO A TRAILER

CROSS REFERENCE TO RELATED APPLICATION

This application claims the benefit of U.S. provisional patent application No. 61/989,966, filed May 7, 2014, which is hereby incorporated by reference.

TECHNICAL FIELD

This technical field relates generally to a system and a method to assist in coupling a vehicle to a trailer, and more particularly relates to a system and a method for aligning a tow hitch ball and a trailer tongue.

BACKGROUND

Some vehicles are equipped with a tow hitch that allows a trailer or other towed vehicle to be coupled thereto so that the towing vehicle can tow the trailer. Generally, the trailer hitch is mounted to a rear support structure of the towing vehicle proximate the vehicle's rear bumper, and includes a hitch ball having a certain diameter. The towed vehicle typically includes a trailer tongue that extends from a front end of the towed vehicle. The trailer tongue often includes a cup in which the hitch ball is positioned to couple the hitch to the trailer tongue. A securing mechanism within the cup, such as a metal flap, is selectively positioned around the ball when it is inserted in the cup to securely hold the tongue to the hitch.

When the towed vehicle is detached from the towing vehicle, the trailer tongue is generally supported on an adjustable stand so that the cup is positioned higher above the ground than the ball of the hitch. When the operator of the towing vehicle attaches the tongue to the hitch, he will back up the towing vehicle to position the hitch ball just below the cup. Once in this position, the tongue is lowered onto the ball by lowering the stand.

Generally it takes a significant amount of experience and skill for the vehicle operator to accurately position the hitch ball below the tongue cup when backing up the towing vehicle to connect the towed vehicle to the towing vehicle. Regardless of the operator's skill and experience, it is nearly impossible to exactly position the hitch ball at the proper location. Therefore, the operator usually must use the trailer tongue to manually move the towed vehicle in a right or left or front or back direction to provide the exact alignment. Because the towed vehicle may be large, heavy and cumbersome to move, this is sometimes a difficult task.

Accordingly, it is desirable to provide a system and method to assist in coupling the vehicle and the trailer. Furthermore, other desirable features and characteristics of the present invention will become apparent from the subsequent detailed description and the appended claims, taken in conjunction with the accompanying drawings and the foregoing technical field and background.

SUMMARY

Methods of assisting in coupling a vehicle and a trailer are provided. A first coupling is operatively connected to the vehicle and a second coupling, connectable to the first coupling, is operatively connected to the trailer. In one exemplary embodiment, the method includes providing a first transceiver at a first predetermined position and providing a second transceiver at a second predetermined position. The method also includes identifying a spatial location of the first coupling. The method further includes disposing a third transceiver adjacent the second coupling and sending wireless signals between each of said transceivers. The method also includes determining a spatial location of the second coupling using triangulation based on the timing of the wireless signals. The method may also include calculating a path between the spatial location of the first coupling and the spatial location of the second coupling. The method may further include conveying the path for facilitating movement of the first coupling toward the second coupling.

In another exemplary embodiment, the method includes providing a camera positioned such that an image produced by the camera includes a region to the rear of the vehicle. The method also includes identifying a spatial location of the first coupling. The method further includes determining a position of the second coupling in the image and calculating a spatial location of the second coupling from the determined position of the second coupling in the image. The method may also include calculating a path between the spatial location of the first coupling and the spatial location of the second coupling. The method may further include conveying the path for facilitating movement of the first coupling toward the second coupling.

A system for assisting in coupling a vehicle and a trailer, according to embodiments, is also provided. The system includes a first coupling operatively connected to the vehicle and a second coupling operatively connected to the trailer and connectable to the first coupling. The system also includes at least one sensing device disposed on the vehicle. A controller is in communication with the at least one sensing device. The controller is configured to identify a spatial location of the first coupling, determine a spatial location of the second coupling using data from the at least one sensing device, calculate a path between the spatial location of the first coupling and the spatial location of the second coupling, and convey the path for facilitating movement of the first coupling toward the second coupling.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. With references to the figures, systems 100 and methods 200 for assisting in connecting a vehicle 102 and a trailer 104 are described and shown herein. The system 100 described herein may be, at least in part, integrated with the vehicle 102. While this application is directed toward a vehicle 102, e.g., a car, bus, truck, tractor, motorcycle, trail, marine vessel, aircraft, spacecraft, and the like, it will be appreciated that the various teachings presented herein can be applied to assist in aligning other objects. Likewise, the trailer 104, as used herein, may be any other object to be linked, connected, or otherwise coupled to the vehicle 102.

Figure 1:
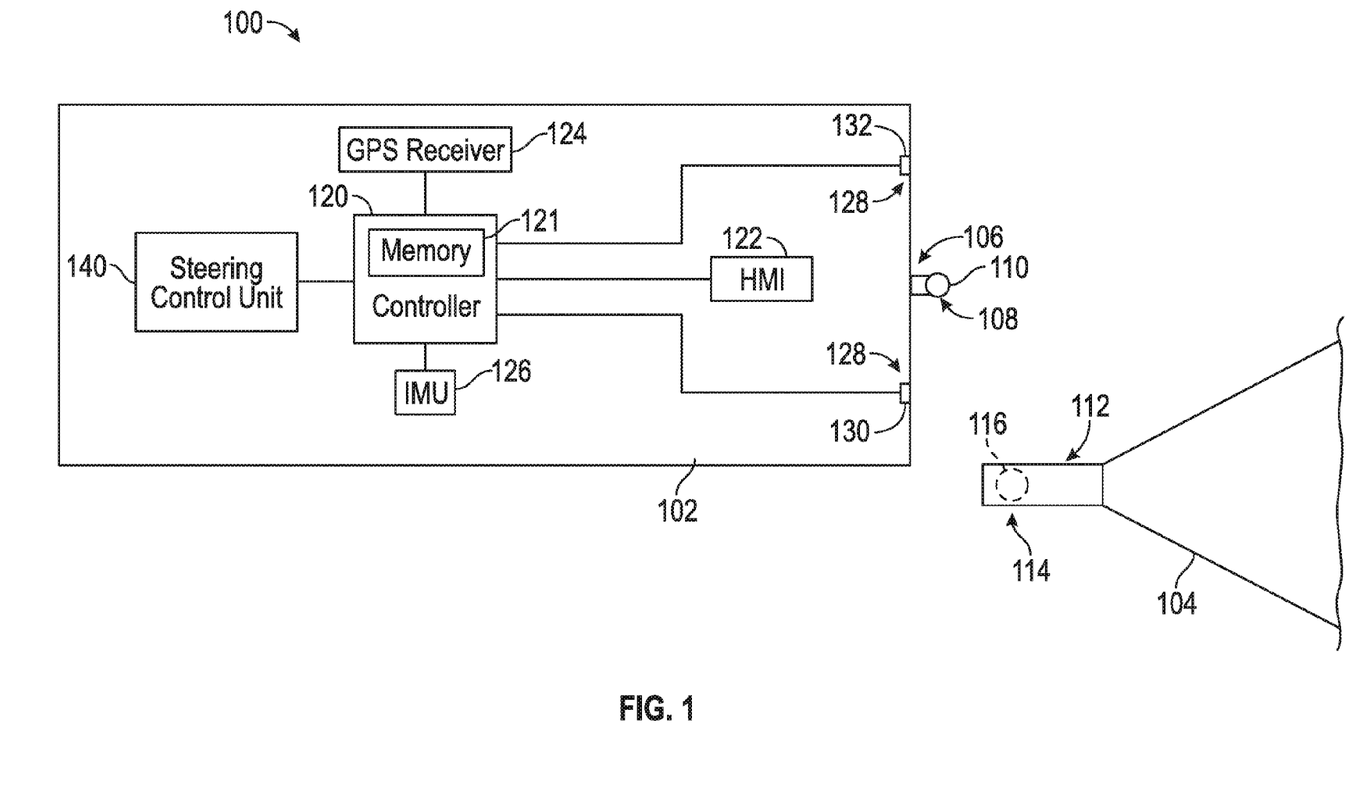
FIG. 1 is a block diagram showing a top view of a vehicle, trailer, and system in accordance with various embodiments.

Referring to FIG. 1, the vehicle 102 is equipped with a tow hitch 106 that allows the trailer 104, or other towed vehicle (not shown), to be coupled thereto so that the vehicle 102 can tow the trailer 104. The tow hitch 106 of the exemplary embodiments is mounted to a rear support structure (not numbered) of the vehicle 102 proximate a rear bumper (not shown) of the vehicle 102. The tow hitch 106 includes a first coupling 108. In the exemplary embodiments, the first coupling 108 is a hitch ball 110. The trailer 104 includes a tongue 112 that extends from a front end (not numbered) of the trailer 104. The trailer tongue 112 includes a second coupling 114 connectable to the first coupling 108. In the exemplary embodiments, the second coupling 114 includes a cup 116 in which the hitch ball 110 is positioned to couple the hitch 106 to the trailer tongue 112. A securing mechanism (not shown) within the cup 114, such as a metal flap (not shown), is selectively positioned around the ball 110 when the ball 110 is inserted in the cup 116 to securely hold the tongue 112 to the hitch 106, and, accordingly, the first coupling 108 to the second coupling 114.

Also in the exemplary embodiments, the system 100 includes at least one controller 120. The controller 120 includes a processor (not shown) capable of performing calculations, executing instructions (i.e., running a program), and/or manipulating data. The controller 120 includes a memory 121 in communication with the processor for storing data and/or instructions. The controller 120 is shown in FIG. 1 as being integrated with the vehicle 102. However, it is to be appreciated that the controller 120 may also or alternatively implemented as an add-on module to the vehicle 102 or as part of a portable device, e.g., a cellular phone, mobile phone, smart phone, and/or tablet computer.

The system 100 also includes a human-machine interface ("HMI") 122 in communication with the controller 120. The HMI 122 is configured to transfer data, information, and other commands between the controller 120 and the user. In one embodiment, the HMI 122 may be a touch screen display (not separately numbered) affixed to a dashboard (not shown) of the vehicle 102 and may be utilized to control multiple aspects of operating the vehicle 102, e.g., radio, climate control, etc., and can be part of an infotainment system (not shown) associated with the vehicle 102. In other embodiments, the HMI 122 may be part of a device (not separately numbered) separate from the vehicle 102. For example, the HMI 122 may be part of a cellular phone, smart phone, tablet computer, or other portable device in communication with the controller 122 via wired or wireless techniques, e.g., Bluetooth.

The system 100 may include a global positioning system ("GPS") receiver 124 for determining a position of the vehicle 102 and/or detecting motion of the vehicle 102 as known to one skilled in the art. The system 100 may further include an inertial measurement unit ("IMU") 126 for detecting motion of the vehicle 102 as also known to one skilled in the art.

Figure 2:
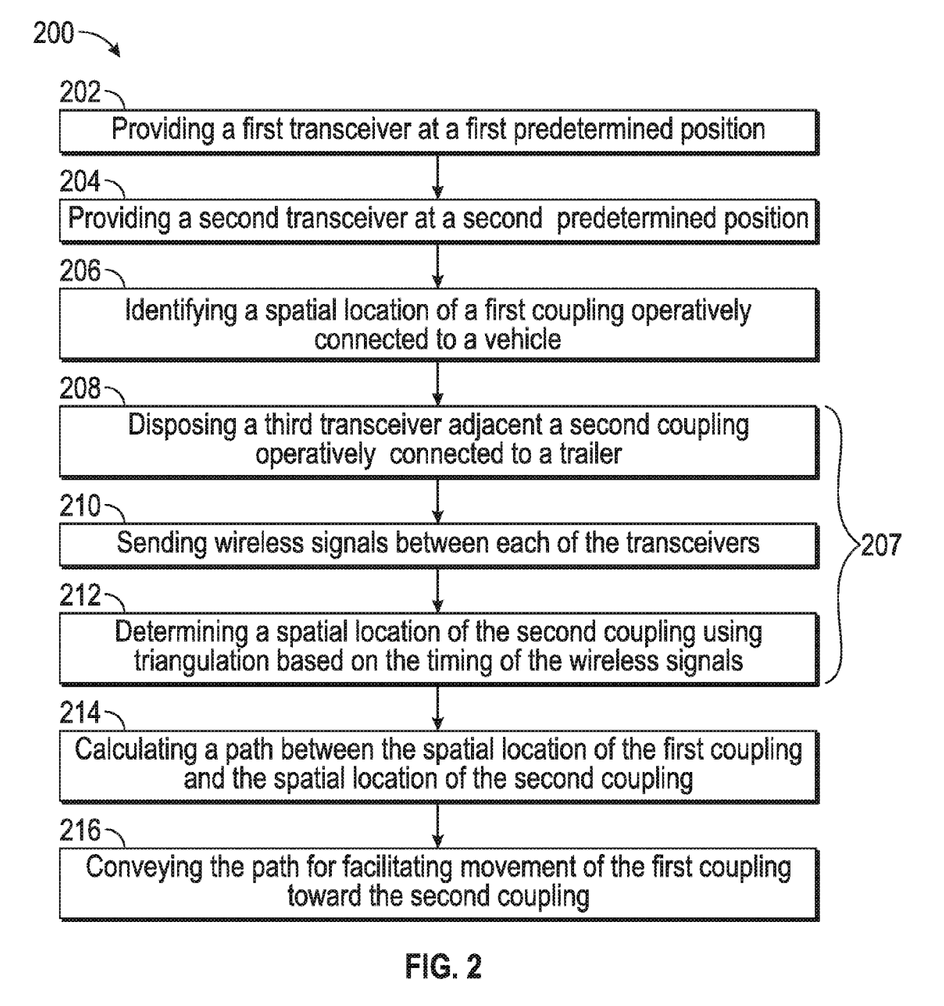
FIG. 2 is a flowchart showing a method of assisting in connecting a vehicle and a trailer in accordance with the embodiment shown in FIG. 1.

The system 100 also includes at least one sensing device 128. In one example, the at least one sensing device 128 includes a first transceiver 130 and a second transceiver 132. In this example, the first and second transceivers 130, 132 are disposed on the vehicle 102 at known positions. For example, the first transceiver 130 is disposed at a first predetermined position and the second transceiver 132 is disposed at a second predetermined position. As such, as shown in FIG. 2, the method 200 of the first exemplary embodiment includes, at 202, providing the first transceiver 130 at the first predetermined position and, at 204, providing the second transceiver 132 at the second predetermined position.

Figure 3:
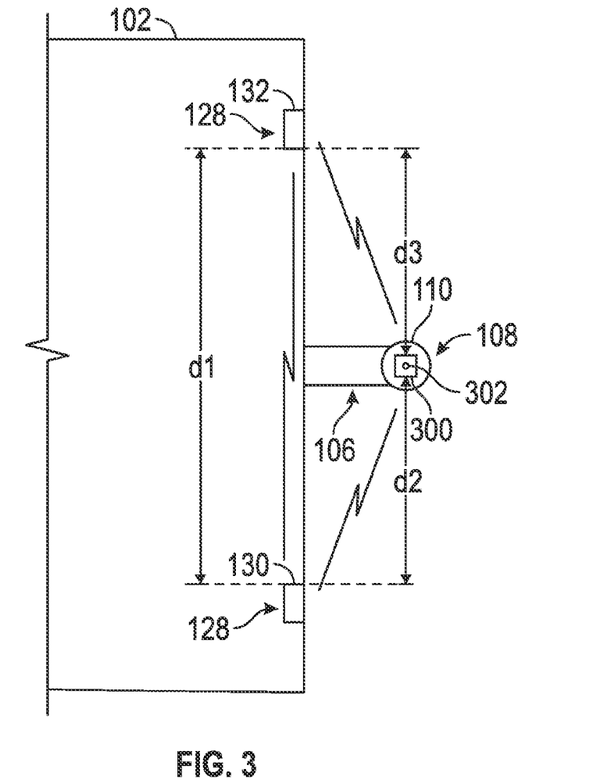
FIG. 3 is a block diagram showing a top view of a rear portion of the vehicle in accordance with the embodiment shown in FIG. 1.

Referring now to FIG. 3, the system 100 of the first exemplary embodiment also includes a third transceiver 300. The third transceiver 300 is movable between positions. The transceivers 130, 132, 300 are configured to transmit and/or receive wireless signals. In one embodiment, the wireless signals may be radio frequency ("RF") signals. In other embodiments, the wireless signals may be in other frequency bands, including, but limited to, light. At least one of the transceivers 130, 132, 300 is in communication with the controller 120. Communication between the at least one transceiver 130, 132, 300 and the controller 120 may be implemented with wired and/or wireless techniques.

The first and second transceivers 130, 132 may be permanently integrated with the vehicle 102, e.g., behind a panel (not shown) of a back door or tailgate (not shown) of the vehicle 102. In other embodiments, the first and second transceivers 130, 132 may be detachable. For instance, the first and second transceivers 130, 132 may be magnetically attachable to and detachable from the back of the vehicle 102.

Figure 4:
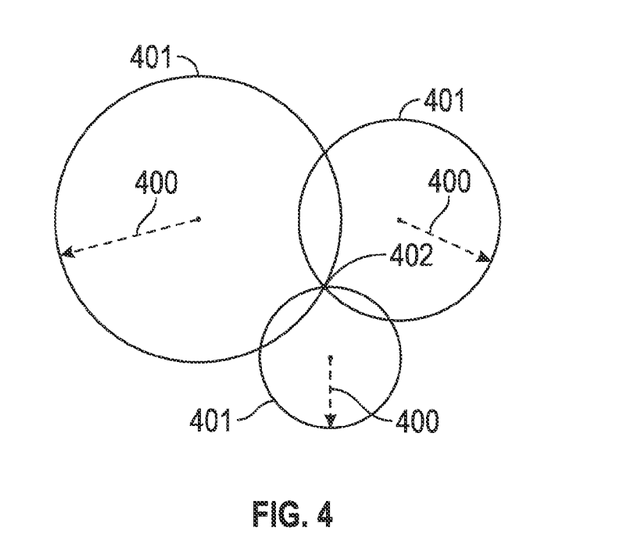
FIG. 4 is a diagram illustrating triangulation concepts in accordance with an embodiment.

The spatial location of the third transceiver 300 may be determined by wireless triangulation as the positions of the first and second transceivers 130, 132 are known. Wireless devices, such as the transceivers 130, 132, 300, can be used to estimate the distances $d_1$, $d_2$, $d_3$ between one another. However, there may be ambiguity with each measurement. Generally, each distance $d_1$, $d_2$, $d_3$ defines a radius 400 of a sphere 401, as shown in FIG. 4. To remove this ambiguity, three measures are needed. There is generally one unique intersection point 402 of the three spheres 401.

Figure 5:
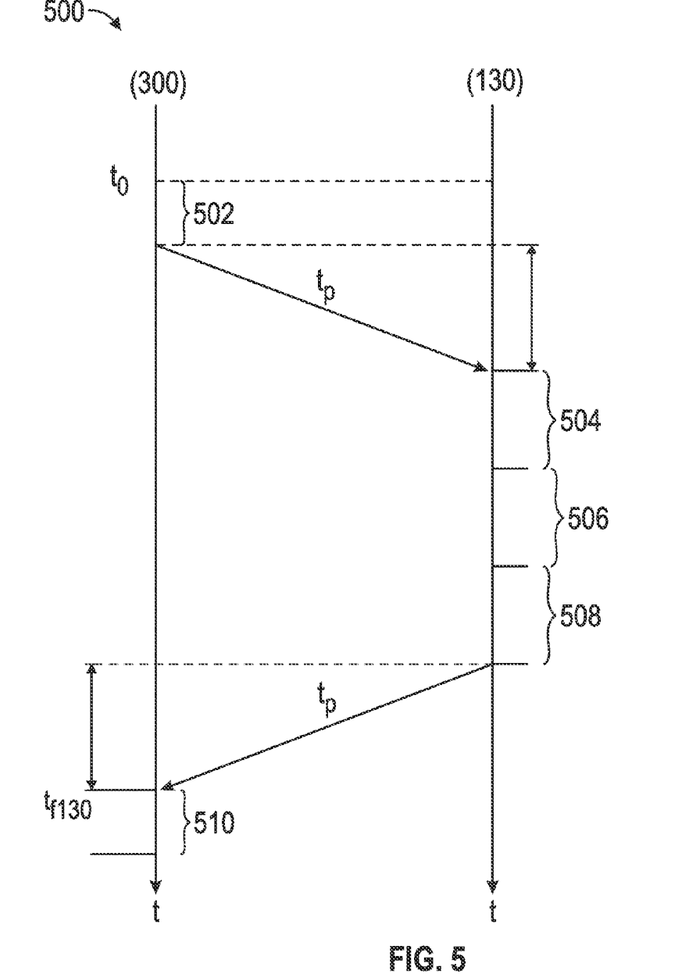
FIG. 5 is a timing diagram showing communication between two wireless transceivers in accordance with an embodiment.

Ideally, a time $t_p$ represents the propagation time it takes for a signal to travel from the transceiver 130, 132, 300 acting as a transmitter to the transceiver 130, 132, 300 acting as a receiver. Each distance $d_1$, $d_2$, $d_3$ between each pair of the transceivers 130, 132, 300 is then calculated from $d_n = c^* t_p$, where $t_p$ is the propagation time and c is the speed of light. However, in practice, numerous delays due to processing of the signals can occur. FIG. 5 illustrates a typical timing diagram 500 showing communications between, for instance, the third transceiver 300 (acting as a "master" transceiver) and the first transceiver 130. At a start time $t_o$, a transmit processing delay 502 occurs prior to transmitting the wireless signal from the third transceiver 300. Once the signal is received by the first transceiver 130, a receive processing delay 504 occurs. A variable delay 506 may also be implemented. Then another transmit processing delay 508 occurs as another wireless signal is transmitted from the third transceiver 130. Finally, after receiving the wireless signal, a receiver processing delay 510 occurs at the third transceiver 300 prior to a final time $t_{f130}$. A calibration time $T_{300\text{-}130}$ between the third transceiver 300 and the first transceiver 100 be calculated as follows: $T_{300\text{-}130} = t_{f130} - t_0$.

Of course, calibration times may also be calculated between (1) the third transceiver 300 and the second transceiver 132 and (2) the first transceiver 130 and the second transceiver 132. Since the processing delays will be similar for each transmission/reception sequence described above, the calibration times may be used by the controller 120 instead of the idealized propagation time $t_p$ to calculate the distances $d_1$, $d_2$, $d_3$ between each of the transceivers 130, 132, 300.

The controller 102 may perform the calculation using just the time delays, i.e., without determining distances and/or positions. The alignment may be accomplished by setting the time delay, as determined above, as the target time delays among the transceivers 130 132, 300. The controller 120 would then determine vehicle path to achieve the target time delays. The communication between transceivers 130, 132, 300 could remain active as the vehicle 102 is moved into position. The controller 120 may monitor the signal delays between the transceivers 130, 132, 300 and adjust a vehicle path to achieve the target delays. For example, the target delay times from a set of transceivers 130, 132, 300 (e.g., first transceiver 130 to third transceiver 300 and second transceiver 132 to third transceiver 300) may be used to determine if the vehicle path is aligned by determining a rate of change of a time delay between the sets of transceivers 130, 132, 300 and an additional change in time required to meet the target time delays which are previously established. The feedback from the controller 120 (i.e., the vehicle path to achieve the target time delays) may be provided to a driver via the HMI 122, including the HMI 122 on consumer electronic devices, and/or could be transmitted to vehicle 102 systems for autonomous operations of steering and/or speed of the vehicle 102.

Referring to FIGS. 2 and 3, one embodiment of the method 200, includes, at 206, identifying a spatial location of the first coupling 108. In a first technique of identifying the spatial location of the first coupling 108, an identification procedure is initiated by the user. For instance, the user may initiate the procedure via the HMI 122. Alternatively, the third transceiver 300 may include a user interface ("UI") (not shown), e.g., a pushbutton, to receive an initiation command. The first technique includes disposing the third transceiver 300 adjacent the first coupling 108. For instance, the third transceiver 300 may be placed on top of the hitch ball 110. Identifying the spatial location according to the first technique further includes sending wireless signals between each of the transceivers 130, 132, 300, as described above. Data regarding signal timing, i.e., the times that signals are sent and received, may then be utilized to determine the spatial location of the first coupling 108, using triangulation as described above. In one embodiment, the data regarding the signal timing is sent to the controller 120 such that the controller 120 performs the triangulation determination. The UI of the third transceiver 300 may also include a feedback regarding the identification procedure. For instance, one or more light-emitting diodes ("LEDs") 302 may blink yellow while the procedure is underway, may blink red to indicate that identification of the spatial location of the first coupling 108 failed, and may illuminate solid green when the procedure is successful.

In a second technique, identifying a spatial location of the first coupling 108 may be predetermined and stored in the memory 121 of the controller 120. For example, when a trailer hitch 106 and the associated first coupling 108 are installed on the vehicle 102 or assembled as part of the vehicle 102, the spatial location may be stored in the memory 121 of the controller 120. The spatial location may be manually measured or simply provided from factory standards.

Figure 6:
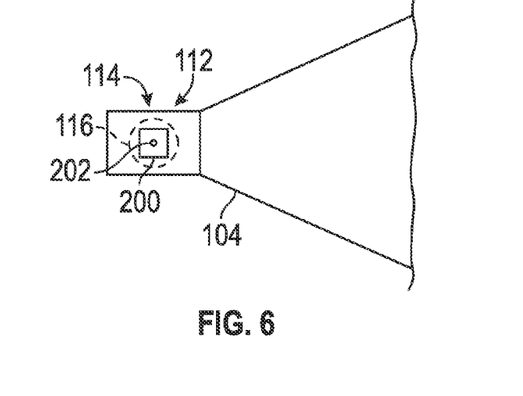
FIG. 6 is a block diagram showing a top view of a tongue of the trailer in accordance with the embodiment shown in FIG. 1.

Referring to FIGS. 1, 2 and 6, the method 200 also includes, at 207, determining the spatial location of the second coupling 114. In one technique, determining the spatial location of the second coupling 114 includes, at 208, disposing the third transceiver 300 adjacent the second coupling 114. For instance, the third transceiver 300 may be placed on top of the cup 116 of the trailer tongue 112. (The third transceiver 300 may be moved directly from the location adjacent the first coupling 108 to the location adjacent the second coupling 112.) The method 200 then includes, at 210, sending wireless signals between each of the transceivers 130, 132, 300. Data regarding signal timing, i.e., the times that signals are sent and received, may then be utilized to determine the spatial location of the second coupling 112, using triangulation, as described above. As such, the method 200 also includes, at 212, determining a spatial location of the second coupling 112 using triangulation based on the timing of the wireless signals. In one embodiment, the data regarding the signal timing is sent to the controller 120 such that the controller 120 performs the triangulation determination.

Figure 7:
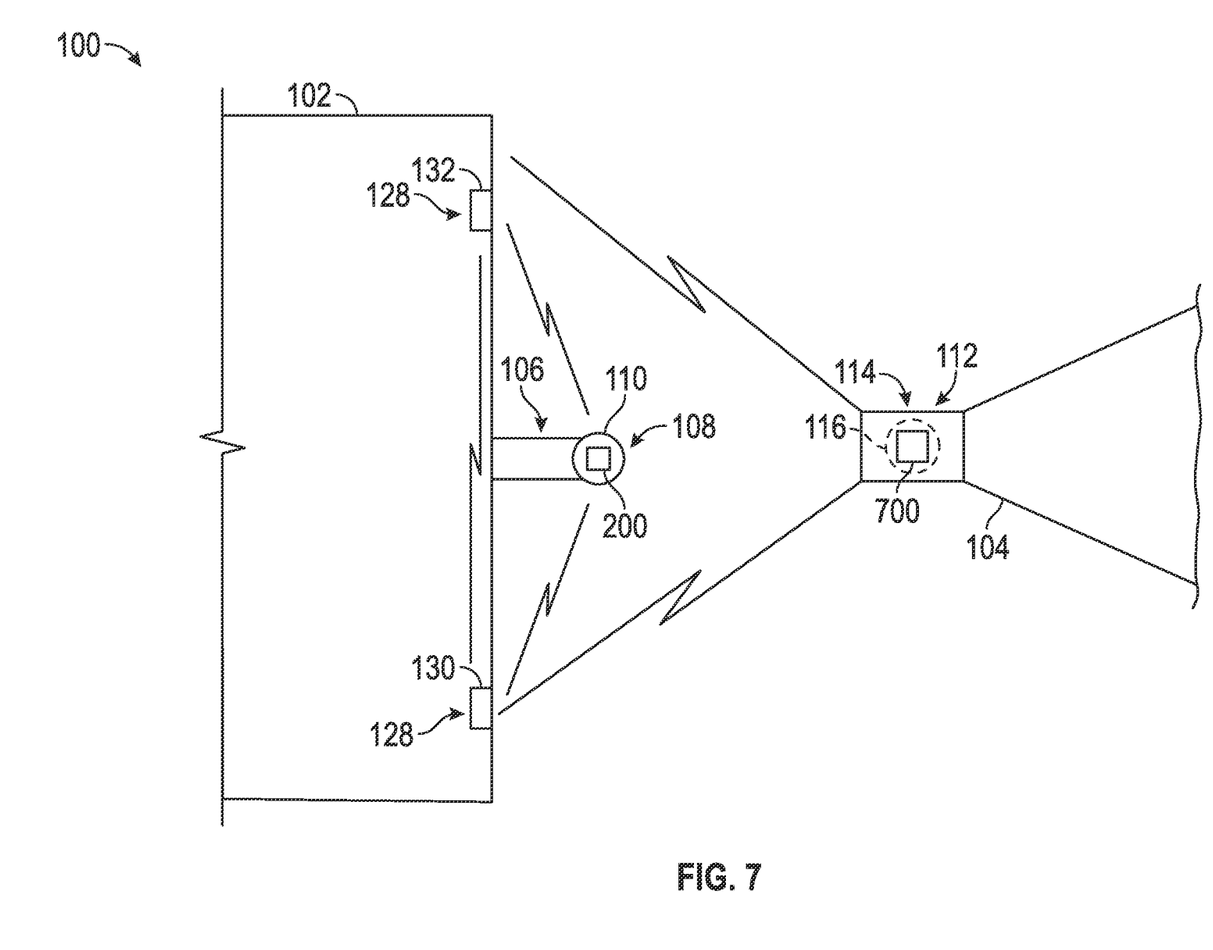
FIG. 7 is a block diagram showing a partial top view of the vehicle and trailer according to an exemplary embodiment.

Referring to FIG. 7, in one embodiment, the system 100 includes a fourth transceiver 700, in addition to the third transceiver 300, which is configured to transmit and/or receive wireless signals. In such a technique, the fourth transceiver 700 may be affixed adjacent the second coupling 112. As such, determining the spatial location of the second coupling 112 may be accomplished by utilizing the signal timing between the first, second, and fourth transceivers 130, 132, 700. In this example, the third transceiver 300 may be affixed adjacent the first coupling 108, and as such, the third transceiver 300 need not be moved between first and second couplings 108, 114.

Figure 8:
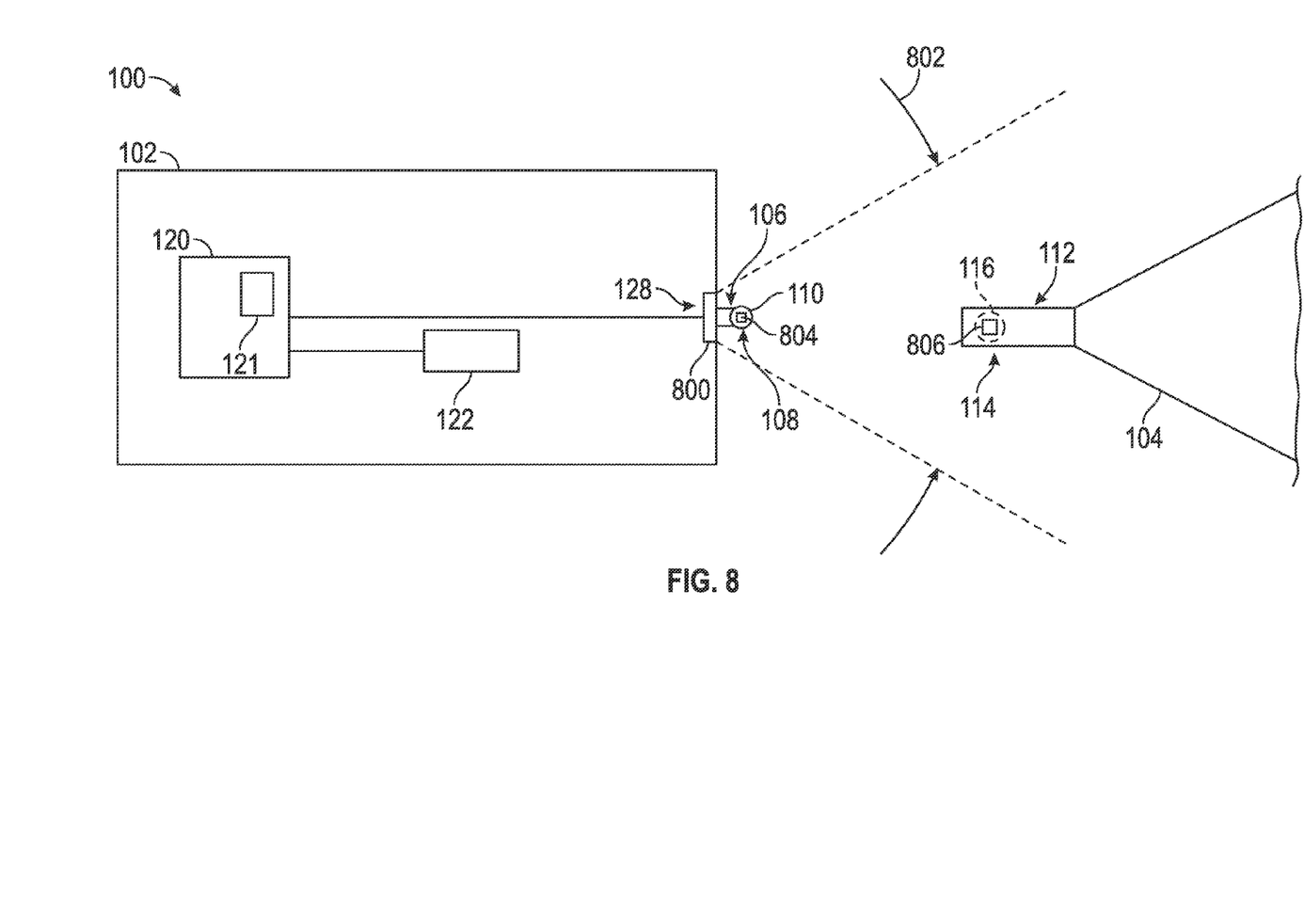
FIG. 8 is a block diagram showing a top view of the vehicle, trailer, and system in accordance with various embodiments.
Figure 9:
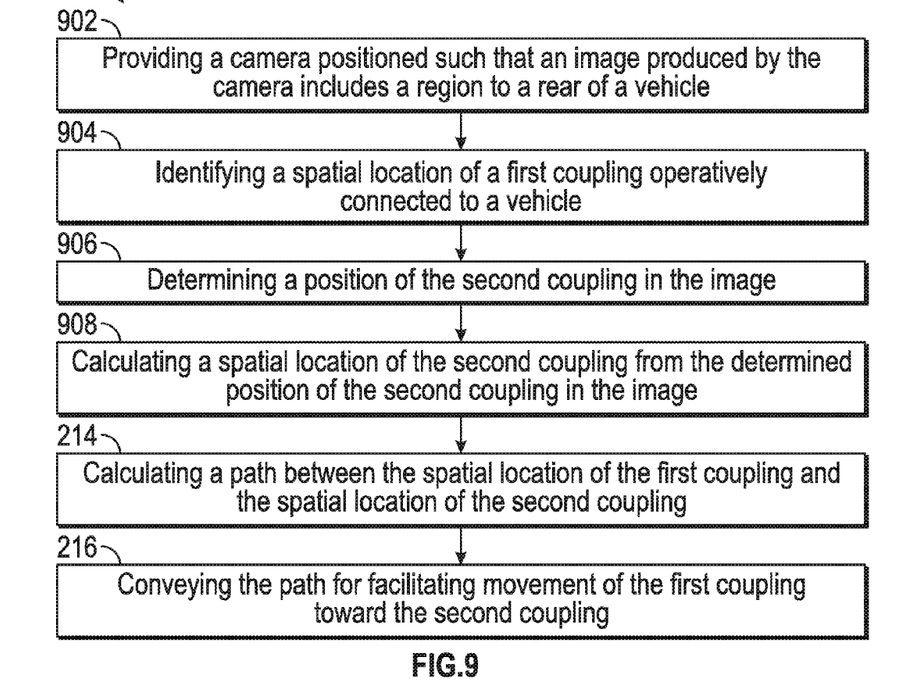
FIG. 9 is a flowchart showing the method of assisting in connecting a vehicle and a trailer in accordance with the embodiment shown in FIG. 8.

In an embodiment shown in FIG. 8, the at least one sensing device 128 of the system 100 includes a camera 800 in communication with the controller 120. The camera 800 is positioned such that an image produced by the camera 800 includes a region 802 to the rear of the vehicle 102. The camera 800 may be part of a rear back-up imaging system, commonly found in many modern vehicles 102. Or, the camera 800 may be stand-alone or part of another system (not shown). As such, and as shown in FIG. 9, the method 200 of the exemplary embodiment shown in FIG. 8 includes, at 902, providing the camera 800 positioned such that an image produced by the camera 800 includes the region 802 to the rear of the vehicle 102.

The method 200 also includes, at 904, identifying a spatial location of the first coupling 108. An identification procedure may be initiated by the user. For instance, the user may initiate the procedure via the HMI 122. Identifying the spatial location includes determining a position of the first coupling 108 in the image. A pattern matching routine, such as a Hough Transform, may be utilized to determine the position of the first coupling 108 in the image. For instance, a circular Hough Transform may be applied when the first coupling 108 is implemented as the hitch ball 110. Determining the position of the first coupling 108 in the image may be aided by disposing a light source 804 adjacent the first coupling 108. In one embodiment, the light source 804 may include an LED (not shown in detail). The LED may emit a predetermined color, i.e., a certain wavelength, which aids in identifying the first coupling in the image. The LED may also, or alternatively, flash a predetermined pattern or frequency that aids in identifying the first coupling 108 in the image.

In one approach to identifying the spatial location of the first coupling 108, it is assumed that the first coupling 108 is disposed along a center plane (not shown) of the vehicle 102. The camera 800 may, or may not, be disposed along the center plane. Once the position of the first coupling 108 in the image is obtained, the spatial location of the first coupling 108 may be calculated with a ray tracing of the spatial location in the image to the center plane of the vehicle 102.

In another approach to identifying the spatial location of the first coupling 108 in the image from the camera 800, a size of the first coupling 108 is identified. When the first coupling 108 is implemented as the hitch ball 110, the size of the first coupling 108 may be a diameter of the hitch ball 110. The diameter of the hitch ball 110 may be received via the HMI 122. For instance, the user may enter the diameter using a keypad (not shown) or other input device. Alternatively, the user may select the diameter of the hitch ball 110 from a plurality of possible diameters. In another alternative, the first coupling 108 includes an automated ball measurement system (not shown) that determines the diameter of the hitch ball 110 automatically and conveys that diameter to the controller 120. When the size of the first coupling 108 is identified and the position of the first coupling 108 is identified in the image, then the spatial location of the first coupling 108 may be calculated based on the known size of the ball 110.

The method 200 shown in FIGS. 8 and 9 further includes, at 906, determining a position of the second coupling 114 in the image produced by the camera 800. In one technique, a presumed height of the second coupling 114 relative to the ground is known and stored in the memory 121. This presumed height serves to narrow the region of the image produced by the camera 800 in which the second coupling 114 may be located. The presumed height may be entered by a user via the HMI 122 and stored in the memory 121 for use by the controller 120.

In another technique, determining the second coupling 114 in the image produced by the camera 800 utilizes multiple images from the camera 800. That is, a motion stereo approach may be utilized to determine the location of the second coupling 114 in the image. The multiple images may be obtained while the vehicle 102 is in motion, e.g., when the vehicle 102 is moving generally toward the second coupling 114.

Determining the position of the second coupling 114 in the image may be aided by disposing a light source 806 adjacent the second coupling 114. The light source 806 may be the same light source 804 used in determining the position of the first coupling 108. That is, the light source 804 may be moved from one position to another. Alternatively, a different light source 806 may be utilized. In one embodiment, the light source 806 may include at least one LED (not shown in detail). The LED may emit a predetermined color, i.e., a certain wavelength, which aids in identifying the second coupling 114 in the image. The LED may also, or alternatively, flash a predetermined pattern that aids in identifying the second coupling 114.

The method 200 of the exemplary embodiment shown in FIGS. 8 and 9 also includes, at 908, calculating a spatial location of the second coupling 114 relative to the first coupling 108 utilizing the determined position of the second coupling 114 in the image. This calculation is achieved by a comparison between objects and positions, in the image, of the first coupling 108 to the second coupling 114.

Figure 10:
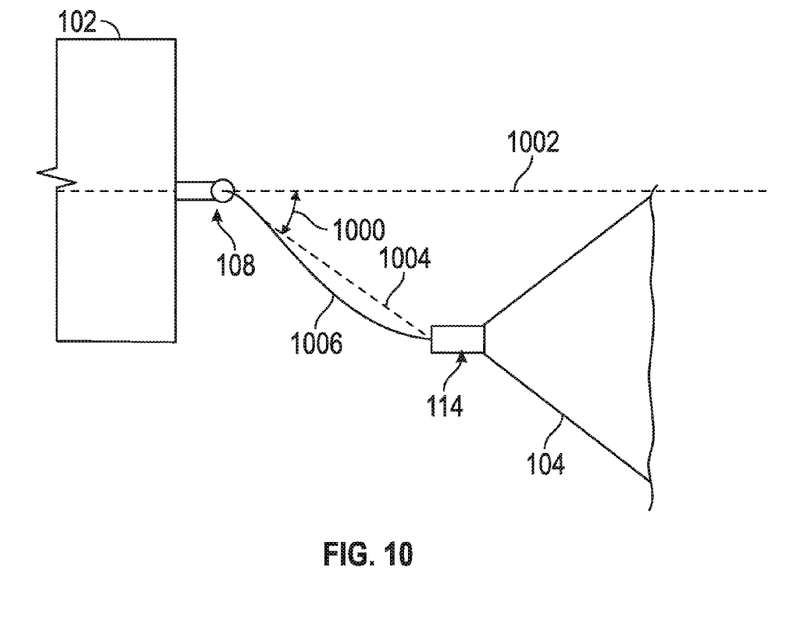
FIG. 10 is a block diagram showing a top view of portions of the vehicle and trailer in accordance with an embodiment.

The methods 200 of the exemplary embodiments also include calculating a distance and an alignment between the first and second couplings 108, 114 based on the respective spatial positions. Referring now to FIG. 10, the alignment refers to the angle 1000 between an axis 1002 of a longitudinal centerline of the vehicle 102 and an axis 1004 disposed through the first and second couplings 108, 114.

The exemplary embodiments described above may be combined to provide greater accuracy in determining the positions of the first and second couplings 108, 114. That is, the spatial locations may be determined by combining features of the systems 100 and/or methods 200 of the above described exemplary embodiments and those positions then compared and/or combined.

Referring now to FIGS. 2 and/or 9, the methods may also include, at 214, calculating a driving path 1006 between the spatial location of the first coupling 108 and the spatial location of the second coupling 114 by the controller 120. In one embodiment, the path 1006 is calculated to be appropriate for the particular vehicle 102. That is, the path 1006 is not outside of the physical and mechanical limitations of the vehicle 102. Said another way, the path 1006 will not include a turning angle that the vehicle 102 is incapable of making.

The path 1006 may be dynamically calculated, i.e., calculated repeatedly as the vehicle 102 moves. For instance, the spatial position of the second coupling 114 relative to the first coupling 108 may be repeatedly determined as the vehicle moves. When one of the spatial positions changes, the path 1006 may be recalculated.

Figure 11:
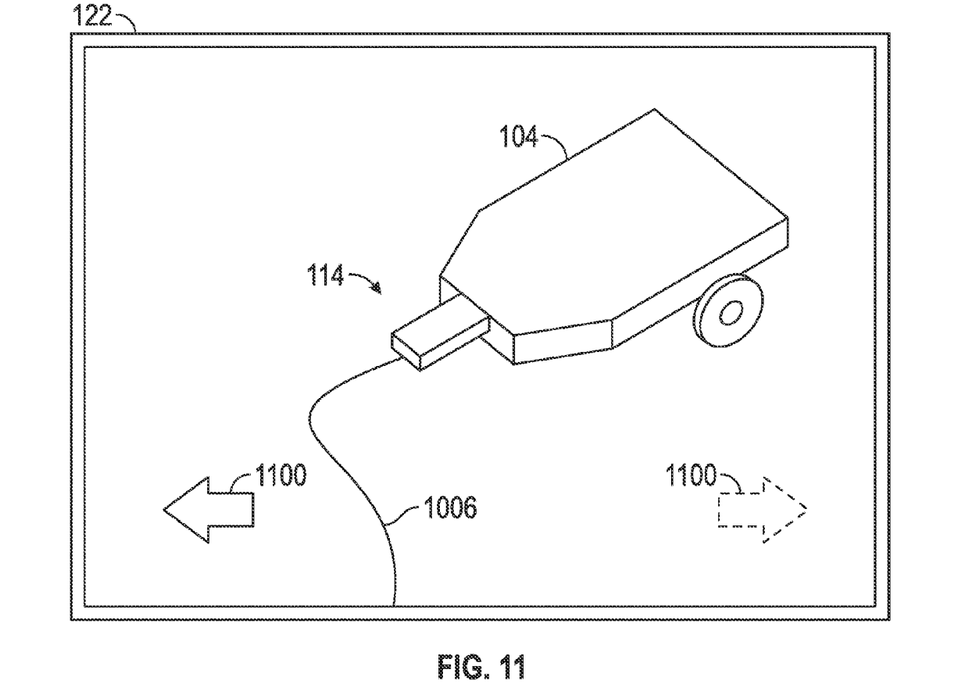
FIG. 11 is a front view of a human-machine interface showing a driving path in accordance with an embodiment.

The method 200 further includes, at 216, conveying the path 1006 for facilitating movement of the first coupling 108 toward the second coupling 114. In one example, as shown in FIG. 11, conveying the path 1006 includes displaying the path 1006 to a user, e.g., a driver of the vehicle 102. In one implementation, the path 1006 may be displayed on the HMI 122 superimposed on the image of the backup camera to guide the driver in maneuvering the vehicle 102. The display of the path 1006 may be updated on the HMI 122 as the vehicle moves. Further, one or more of the light sources 804, 806, e.g., LEDs, on one or more of the couplings 108, 114 may provide visual feedback, through the HMI 122 to the user. For example, the LEDs can blink at a rate that is related to the distance to travel. For example, the LEDs could blink faster as the distances can get smaller. The LEDs may also provide alignment feedback. For example, an array of LEDs could represent misalignment by turning on more or less LEDs to represent higher or lower misalignment, respectively. When aligned, only a central LED may be illuminated. As another example, a single, multicolor LED may be utilized where, for example, green indicates alignment between the vehicle 102 and the trailer 104, yellow indicates misalignment to the left, and red indicates misalignment to the right. In either alignment example, the LEDs may still blink at a rate that relates to separation distance.

The method 200 may also include providing driving directions to the user, i.e., the driver, of the vehicle 102 in addition to or instead of displaying the path 1006. For instance, in one embodiment, the controller 120 may actuate turn signals (not shown) of the vehicle 102 indicating that the driver should turn left or right. In another embodiment, audible prompts may be indicated by the infotainment system (not shown) of the vehicle 102. In yet another embodiment, turn arrows 1100 may be displayed on the HMI 122. Of course, other techniques to provide driving directions will be appreciated by those skilled in the art.

Referring again to FIG. 1, the vehicle 102 may include a steering control unit 140 configured to control steering of the vehicle 102. For instance, the steering control unit 140 may rotate a steering column (not shown) other component operatively connected to turn the wheels (not shown) of the vehicle 102. The steering control unit 140 may include, or be a part, of an electric power steering ("EPS") system (not shown).

In one exemplary embodiment, the controller 120 is in communication with the steering control unit 140. In this embodiment, conveying the path 1006 may include sending the path 1006 to the steering control unit 140 of the vehicle 102. As such, the steering control unit 140 may turn the wheels and/or the steering wheel in order to route the vehicle 102 along the path 1006. The controller 120 may also be in communication with the powertrain (not shown) of the vehicle 102 such that the speed and gearing of the vehicle 102 may also be automatically controlled to maneuver the vehicle 102 toward the trailer 104.

Figure 12:
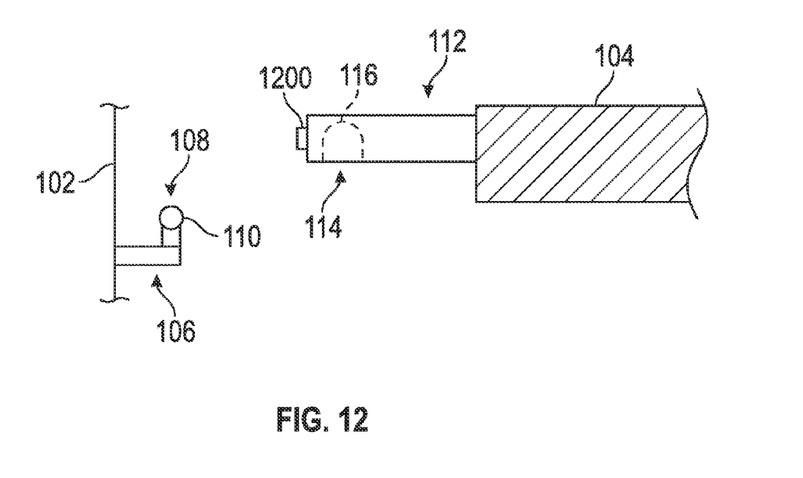
FIG. 12 is a block diagram showing a side view of portions of the vehicle and trailer in accordance with an embodiment.

Referring now to FIG. 12, the system 100 may further includes at least one proximity sensor 1200. In the exemplary embodiment, the proximity sensor 1200 is disposed on the second coupling 114. However, it should be appreciated that the proximity sensor 1200 may alternatively be disposed on the first coupling 108 or adjacent one of the couplings 108, 114. The proximity sensor 1200 provides final small alignment guidance as the vehicle 102 and the trailer 104 near final hitching position to insure an even more accurate alignment.

The proximity sensor 1200 may be a Hall effect sensor or other suitable device for sensing the presence of an object near the sensor 1200. In this exemplary embodiment, the proximity sensor 1200 disposed on the second coupling 114 is utilized to sense the presence and/or distance of the first coupling 108 from the second coupling 114. As such, the proximity sensor 1200 is utilized in the latter stages of moving the first coupling 108 toward the second coupling 114.

The proximity sensor 1200 of the exemplary embodiment is in communication with the controller 120 (not shown in FIG. 12) such that data sensing performed by the proximity sensory 1200 may be communicated to the controller 120. This communication may be achieved via RF communications or other techniques known to those skilled in the art. It should be appreciated that the proximity sensor 1200 may be used in conjunction with any of the systems 100 and/or methods 200 described in the exemplary embodiments herein.

The system 100 and methods 200 of the various exemplary embodiments may be utilized in conjunction with one another, to further improve accuracy of locating the couplings 108, 114. Alternatively, or additionally, the system 100 and method 200 of the exemplary embodiments may be utilized in conjunction with another system and/or method. The various embodiments of the system 100 and methods 200 may be combined through a temporal, spatial, or temporal/spatial based filtering technique, such as Kalman or Particle filters.

For instance, one embodiment would provide a first estimate to the spatial position and range of the second coupling 114. This information/data would be used by another embodiment to better determine the actual spatial position of the second coupling 114 at a low level/data level processing.

In one possible implementation, the wireless sensing embodiment provides approximate spatial position of the hitch ball 110, then a vision-based system determines the position of the trailer tongue 114 by focusing in the region identified by the wireless sensing embodiment. In another possible implementation, the vision-based embodiment provides basic position of the hitch ball 110 or trailer tongue 114. The wireless embodiment then uses this information to adjust timing estimates to determine actual position of the hitch ball 110 or trailer tongue 114.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of assisting in coupling a vehicle and a trailer, said method comprising:
   providing a first transceiver at a first predetermined position;
   providing a second transceiver at a second predetermined position;
   disposing a third transceiver adjacent to a first coupling that is operatively connected to the vehicle;
   identifying a spatial location of the first coupling with a controller;
   based on the identification of the spatial location of the first coupling, moving the third transceiver adjacent to a second coupling that is operatively connected to the trailer;
   sending wireless signals between each of the transceivers;
   determining a spatial location of the second coupling using triangulation based on the timing of the wireless signals with the controller;
   calculating a path between the spatial location of the first coupling and the spatial location of the second coupling with the controller; and
   conveying the path for facilitating movement of the first coupling toward the second coupling.

2. The method as set forth in claim 1, wherein identifying the spatial location of the first coupling comprises:
   sending wireless signals between each of said transceivers.

3. The method as set forth in claim 2, wherein identifying the spatial location of the first coupling includes determining the spatial location of the first coupling using triangulation based on the timing of the wireless signals.

4. The method as set forth in claim 1, wherein conveying the path comprises displaying the path to a user.

5. The method as set forth in claim 1, wherein conveying the path comprises transmitting the path to a steering control unit.

6. A method of assisting in coupling a vehicle and a trailer, said method comprising:
   providing a camera positioned such that an image produced by the camera includes a region to a rear of the vehicle;
   determining a position of a first coupling that is operatively connected to the vehicle based on the image;
   calculating a spatial location of the first coupling from the determined position of the first coupling;
   determining a position of a second coupling that is operatively connected to the trailer based on the image;
   calculating a spatial location of the second coupling relative to the first coupling from the determined position of the second coupling;

calculating an alignment between the first coupling and the second coupling based on the calculated spatial location of the first coupling and the second coupling, the alignment comprising an angle between an axis of a longitudinal centerline of the vehicle and an axis disposed through the first coupling and the second coupling;

calculating a path between the spatial location of the first coupling and the spatial location of the second coupling; and conveying the path for facilitating movement of the first coupling toward the second coupling, wherein conveying the path includes conveying a misalignment or alignment between the vehicle and the trailer.

7. The method as set forth in claim 6, wherein determining the position of the first coupling includes disposing a first light source adjacent to the first coupling and determining the position of the second coupling further comprises disposing a second light source adjacent to the second coupling.

8. The method as set forth in claim 7, wherein conveying the misalignment or the alignment between the vehicle and the trailer further comprises:

illuminating at least one of the first light source and the second light source to provide visual feedback of the alignment or misalignment.

9. The method as set forth in claim 7, wherein conveying the path further comprises:

illuminating at least one of the first light source and the second light source based on a distance to travel between the first coupling and the second coupling.

10. The method as set forth in claim 6, wherein the first coupling includes a hitch ball and calculating the spatial location of the first coupling includes applying a Hough Transform to the image.

11. The method as set forth in claim 6, wherein the first coupling includes a hitch ball and calculating the spatial location of the first coupling further comprises receiving the size of the hitch ball.

12. The method as set forth in claim 11, wherein receiving the size of the hitch ball includes applying a Hough Transform to the image to calculate the size of the hitch ball.

13. The method as set forth in claim 11 wherein receiving the size of the hitch ball includes receiving the size of the hitch ball from a user via a human-machine interface ("HMI").

14. The method as set forth in claim 6, wherein conveying the path comprises displaying the path on a human-machine interface.

15. The method as set forth in claim 6, wherein conveying the path comprises transmitting the path to a steering control unit.

16. A system for assisting in coupling a vehicle and a trailer, comprising:

a first coupling that is operatively connected to the vehicle;

a second coupling that is operatively connected to the trailer and connectable to the first coupling;

at least one sensing device disposed on the vehicle, the at least one sensing device including a first transceiver disposed at a first predetermined position of the vehicle, a second transceiver disposed at a second predetermined position of the vehicle and a third transceiver movable relative to the vehicle;

a controller in communication with said at least one sensing device and configured to identify a spatial location of the first coupling based on a position of the third transceiver as adjacent to the first coupling;

determine a spatial location of the second coupling based on a position of the third transceiver as adjacent to the second coupling;

calculate a path between the spatial location of the first coupling and the spatial location of the second coupling; and convey the path for facilitating movement of the first coupling toward the second coupling.

17. The system as set forth in claim 16, wherein:

each of said first transceiver, said second transceiver, and said third transceiver are configured to send wireless signals to said other transceivers and receive wireless signals from each other.

18. The system as set forth in claim 16 further comprising a steering control unit in communication with said controller for controlling operation of the steering of the vehicle and wherein said controller transmits the path to said steering control unit.

19. The system as set forth in claim 16, wherein the controller is configured to output the path to a human-machine interface.

* * * * *